United States Patent
Morii et al.

(10) Patent No.: US 8,713,793 B2
(45) Date of Patent: *May 6, 2014

(54) METHOD FOR PRODUCING METALLIC-SODIUM-FILLED ENGINE VALVE

(75) Inventors: Hirokazu Morii, Tokyo (JP); Hyoji Yoshimura, Nagoya (JP)

(73) Assignees: Mitsubishi Heavy Industries, Ltd., Tokyo (JP); Yoshimura Company, Nagoya-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/504,910

(22) PCT Filed: Sep. 9, 2010

(86) PCT No.: PCT/JP2010/065465
§ 371 (c)(1),
(2), (4) Date: Jun. 19, 2012

(87) PCT Pub. No.: WO2011/104912
PCT Pub. Date: Sep. 1, 2011

(65) Prior Publication Data
US 2012/0246934 A1 Oct. 4, 2012

(30) Foreign Application Priority Data
Feb. 26, 2010 (JP) ................. 2010-041408

(51) Int. Cl.
*B21K 1/22* (2006.01)
(52) U.S. Cl.
USPC ............. 29/888.4; 29/888.45; 29/888.451; 29/890.12; 72/349; 72/256; 72/352; 123/188.2; 123/188.3

(58) Field of Classification Search
USPC ............. 29/888.4, 888.45, 888.451, 890.12; 72/349, 256, 352; 123/188.2, 188.3
See application file for complete search history.

(56) References Cited

U.S. PATENT DOCUMENTS 2,411,734 A * 11/1946 Kerwin et al. ............. 123/188.1
(Continued)

FOREIGN PATENT DOCUMENTS

EP 0265919 A1 5/1988
(Continued)

OTHER PUBLICATIONS

International Search Report and Written Opinion of the International Searching Authority for International Application No. PCT/JP2005/020975 mailed Feb. 21, 2006 with English translation.

(Continued)

*Primary Examiner* — David Bryant
*Assistant Examiner* — Ruth G Hidalgo-Hernandez
(74) *Attorney, Agent, or Firm* — Birch, Stewart, Kolasch & Birch, LLP

(57) ABSTRACT

Disclosed is a method—for producing an engine valve (V) filled with metallic sodium (Na) within by means of: forming a stem section (S), which has a hollow section (H), at an intended size by successively drawing the stem section (S) using dies (D1, D2, Dx, Dx+1, Dn) in a manner so as to causing the size of the outer diameter and the inner diameter of the stem section (S) to contact in a stepwise fashion; and inserting metallic sodium (Na) into the hollow section (H) of the stem section (S)—wherein after drawing the stem section (S) until the inner diameter of the hollow section (H) of the stem section (S) has become a prescribed size (steps S11-S15) and then inserting the block-shaped solid metallic sodium (Na) into the hollow section (H) of the stem section (S) (step S16), the stem section (S) is further drawn (steps S17 and S18).

3 Claims, 2 Drawing Sheets

(56) References Cited

U.S. PATENT DOCUMENTS

| | | | | |
|---|---|---|---|---|
| 2,440,461 | A | * | 4/1948 | Clements ................... 29/888.45 |
| 2,471,937 | A | * | 5/1949 | Colwell ................... 29/888.451 |
| 2,548,092 | A | * | 4/1951 | Bartlett et al. ............. 123/41.16 |
| 2,731,708 | A | * | 1/1956 | Kubera ................... 29/888.451 |
| 3,186,209 | A | * | 6/1965 | Friedman ........................ 72/334 |
| 5,054,195 | A | * | 10/1991 | Keck et al. ............... 29/888.453 |
| 5,056,219 | A | * | 10/1991 | Iwase ....................... 29/888.451 |
| 5,413,073 | A | * | 5/1995 | Larson et al. .............. 123/188.3 |
| 5,769,037 | A | * | 6/1998 | Ohtsubo et al. ............ 123/41.34 |
| 6,139,660 | A | * | 10/2000 | Nagashima et al. .......... 148/677 |
| 6,161,285 | A | * | 12/2000 | Eberhardt et al. ....... 29/888.451 |
| 2009/0266314 | A1 | * | 10/2009 | Uchiyama et al. ......... 123/41.16 |

FOREIGN PATENT DOCUMENTS

| | | | |
|---|---|---|---|
| EP | 0911493 | A2 * | 4/1999 |
| EP | 1640086 | A1 * | 3/2006 |
| JP | 3-18605 | A | 1/1991 |
| JP | 7-102917 | A | 4/1995 |
| JP | 7-119421 | A | 5/1995 |
| JP | 4390291 | B1 | 10/2009 |
| JP | 4390291 | B1 * | 12/2009 |
| WO | WO 2007/057946 | A1 | 5/2007 |

OTHER PUBLICATIONS

International Search Report and Written Opinion of the International Searching Authority for International Application No. PCT/JP2010/065465 mailed Nov. 9, 2010 with English translation.

Chinese Office Action dated Nov. 28, 2013 for Chinese Application No. 201080058061.3.

* cited by examiner

METHOD FOR PRODUCING METALLIC-SODIUM-FILLED ENGINE VALVE

BACKGROUND OF THE INVENTION

1. Field of the Invention

The present invention relates to a method for producing an engine valve filled inside with metallic sodium.

2. Description of the Related Art

In an engine valve of an automobile or the like, in order to respond to an increase in performance, a reduction in fuel consumption of an engine, and the like, the weight is reduced and the heat transmission is increased by providing a hollow portion in the engine valve and filling the hollow portion with metallic sodium.

Such an engine valve is produced as follows. First, for example, in a solid round-bar shaped material, an umbrella portion is formed by forging or the like and a hollow portion is formed with a punch and the like in an inner part of a portion that becomes a stem portion. Thereafter, the stem portion is inserted into multiple tubular dies different in size sequentially and is drawn sequentially in such a way that sizes of an outer diameter and an inner diameter of the stem portion are reduced stepwise and the length of the stem portion is increased stepwise. The stem portion having an intended size is thus formed (for example, see Patent Literature 1 listed below).

Next, (1) solid metallic sodium is extruded into a bar shape, cut into a predetermined length, and then inserted into the hollow portion; or (2) solid metallic sodium is heated to melt (about 120° C. to 300° C.) into a liquid state and then put into the hollow portion by injecting a predetermined amount of metallic sodium into the hollow portion. Thereafter, an opening at an upper end of the stem portion is sealed (for example, see Patent Literature 2 listed below). The engine valve filled inside with metallic sodium is thus produced.

CITATION LIST

Patent Literatures

Patent Literature 1: Japanese Patent No. 4390291
Patent Literature 2: Japanese Patent Application Publication No. Hei 3-018605

SUMMARY OF INVENTION

Technical Problem

However, a conventional method for producing a metallic-sodium-filled engine valve as described above has the following problems.
(1) Solid metallic sodium is difficult to extrude and the workability of shaping the solid metallic sodium is thereby poor.
(2) When liquid metallic sodium adheres to an inner wall of the elongated hollow portion (a diameter of about 2 to 4 mm) during the injection of metallic sodium into the hollow portion, metallic sodium immediately cools and becomes solid thereby closing the hollow portion. Thus, liquid metallic sodium needs to be injected while the stem portion is heated (98° C. or higher) and the workability of injection is thereby poor.

The present invention is made in view of the problems described above, and an object thereof is to provide a method for producing a metallic-sodium-filled engine valve by which metallic sodium can be easily put into the inside of an engine valve.

Solution to Problem

In a method for producing an engine valve filled inside with metallic sodium, according a first aspect of the invention for solving the aforementioned problems, the engine valve is produced by: shaping a stem portion having a hollow portion to an intended size by sequentially drawing the stem portion in such a way that sizes of an outer diameter and an inner diameter of the stem portion are reduced stepwise; and putting metallic sodium into the hollow portion of the stem portion, the method characterized by comprising shaping the stem portion to the intended size by drawing the stem portion after putting a block-shaped piece of solid metallic sodium into the hollow portion of the stem portion.

The method for producing a metallic-sodium-filled engine valve according to a second aspect of the invention is characterized in that, in the method according to the first aspect of the invention, the stem portion is shaped to the intended size by drawing the stem portion until the inner diameter of the hollow portion of the stem portion is reduced to a specified size, then putting the block-shaped piece of solid metallic sodium into the hollow portion of the stem portion, and thereafter further drawing the stem portion.

The method for producing a metallic-sodium-filled engine valve according to a second aspect of the invention is characterized in that, in the method according to the first aspect of the invention, the stem portion is shaped to the intended size by drawing the stem portion after putting the block-shaped piece of solid metallic sodium into the hollow portion of the stem portion before performing the drawing of the stem portion.

Advantageous Effects of Invention

In the method for producing a metallic-sodium-filled engine valve of the present invention, the block-shaped piece of metallic sodium is put into the hollow portion of the stem portion and the stem portion is then shaped to the desired size by drawing the stem portion. Thus, metallic sodium can be put into the hollow portion by simply cutting out the block-shaped piece of metallic sodium block from raw sodium in a size easy to handle and then putting the block-shaped piece of metallic sodium into the hollow portion. Hence, metallic sodium can be easily put into to the inside of the engine valve.

DETAILED DESCRIPTION OF THE INVENTION

Embodiments of a method for producing a metallic-sodium-filled engine valve of the present invention are described below based on the drawings. However, the present invention is not limited to the embodiments described below based on the drawings.

<Main Embodiment>

Figure 1:
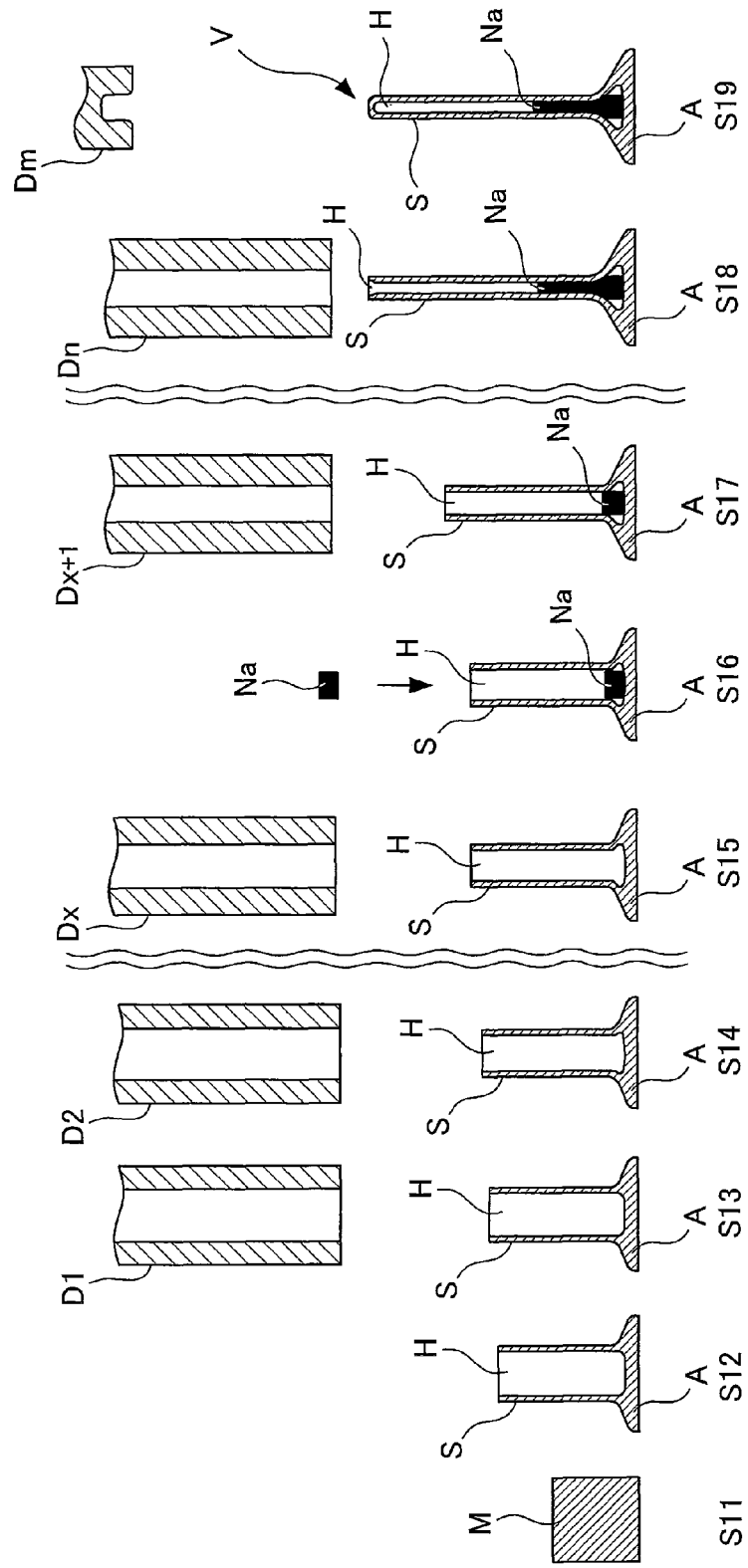
FIG. 1 is a view for explaining procedures in a main embodiment of a method for producing a metallic-sodium-filled engine valve of the present invention.

A main embodiment of a method for producing a metallic-sodium-filled engine valve of the present invention is described based on FIG. 1.

As shown in FIG. 1, first, a material M having a solid round-bar shape (for example, a diameter of about 16 to 20 mm and a length of about 35 to 50 mm) is prepared (step S11). Then, an umbrella portion A is formed by forging or the like while a hollow portion H (for example, an inner diameter of about 15 to 19 mm) is formed with a punch and the like (step S12). Next, a stem portion S (a peripheral portion of the hollow portion H) is drawn by being inserted into a tubular die D1 having an inner diameter smaller (for example, about −0.5 mm to −1.5 mm) than an outer diameter of the stem portion S to reduce the sizes of the outer diameter and the inner diameter of the stem portion S and to increase the length thereof (step S13).

Then, the stem portion S is further drawn by being inserted again into a tubular die D2 having an inner diameter smaller (for example, about −0.5 mm to −1.5 mm) than the die D1 to further reduce the sizes of the outer diameter and the inner diameter of the stem portion S and to further increase the length thereof (step S14). Hereafter, processes of the drawing are sequentially performed to reduce, stepwise, the outer diameter and the inner diameter of the stem portion S to specified sizes (for example, an inner diameter of about 10 to 15 mm) and to increase, stepwise, the length thereof by using multiple dies Dx different in size sequentially, the dies Dx each having an inner diameter slightly smaller (for example, about 0.5 mm to 1.5 mm) than one used therebefore (step S15).

After the drawing is performed as described above and the stem portion S is reduced to the specified size, a block-shaped piece of metallic sodium Na (for example, a hexahedron with edges each having a length of about 8 to 13 mm) cut out from raw sodium into a predetermined size is put into the hollow portion H from an opening in an upper portion of the hollow portion H in a dry inert gas atmosphere (for example, a dry nitrogen gas or the like) (step S16).

After the block-shaped piece of metallic sodium Na cut out into the predetermined size is put into the hollow portion H as described above, the stem portion S is drawn again in the dry inert gas atmosphere (for example, the dry nitride gas or the like), by being inserted into a tubular die Dx+1 having an inner diameter smaller (for example, about −0.5 to −1.5 mm) than the dies Dx to further reduce the sizes of the outer diameter and the inner diameter of the stem portion S and to further increase the length thereof (step S17). At this time, the block-shaped piece of metallic sodium Na put into the hollow portion H deforms to follow the deformation of the hollow portion H along with the drawing.

Hereafter, processes of drawing are sequentially performed to reduce, stepwise, the outer diameter and the inner diameter of the stem portion S to intended sizes (for example, an outer diameter of about 5 to 7 mm and an inner diameter of about 2 to 4 mm) and to increase, stepwise, the length thereof to an intended length (for example, about 55 to 90 mm) by using multiple dies Dn different in size sequentially, the multiple dies Dn each having an inner diameter slightly smaller (for example, about 0.5 mm to 1.5 mm) than one used therebefore (step S18).

After the outer diameter and the inner diameter of the stem S are reduced to the intended sizes and the length thereof is also reduced to the intended length, an end portion of the stem portion S is closed by performing plastic working with a metal die Dm (step S19). An engine valve V having the hollow portion H of the stem portion S filled with metallic sodium Na can be thus obtained.

Conventionally, a piece of solid metallic sodium extruded into a bar shape or liquid metallic sodium heated to melt (about 120 to 300° C.) is used, so that metallic sodium Na can be put into the hollow portion H of the stem portion S which has been shaped by being drawn to the intended size (for example, an inner diameter of about 2 to 4 mm). However, in the embodiment, the stem portion S is drawn to the specified size (for example, an inner diameter of about 10 to 15 mm) which is larger than the intended size. Then, the block-shaped piece of solid metallic sodium Na (for example, a hexahedron with edges each having a length of about 8 to 13 mm) is put into the hollow portion H of the stem portion S. Thereafter, the stem portion S is shaped to the intended size by further drawing the stem portion S.

Accordingly, in the embodiment, metallic sodium Na can be put into the hollow portion H by simply cutting out the block-shaped piece of metallic sodium Na from raw sodium in a size easy to handle and then putting the block-shaped piece of metallic sodium Na from the opening in the upper portion of the hollow portion H.

Hence, in the embodiment, metallic sodium Na can be easily put into the inside of the engine valve V.

<Other Embodiment>

Figure 2:
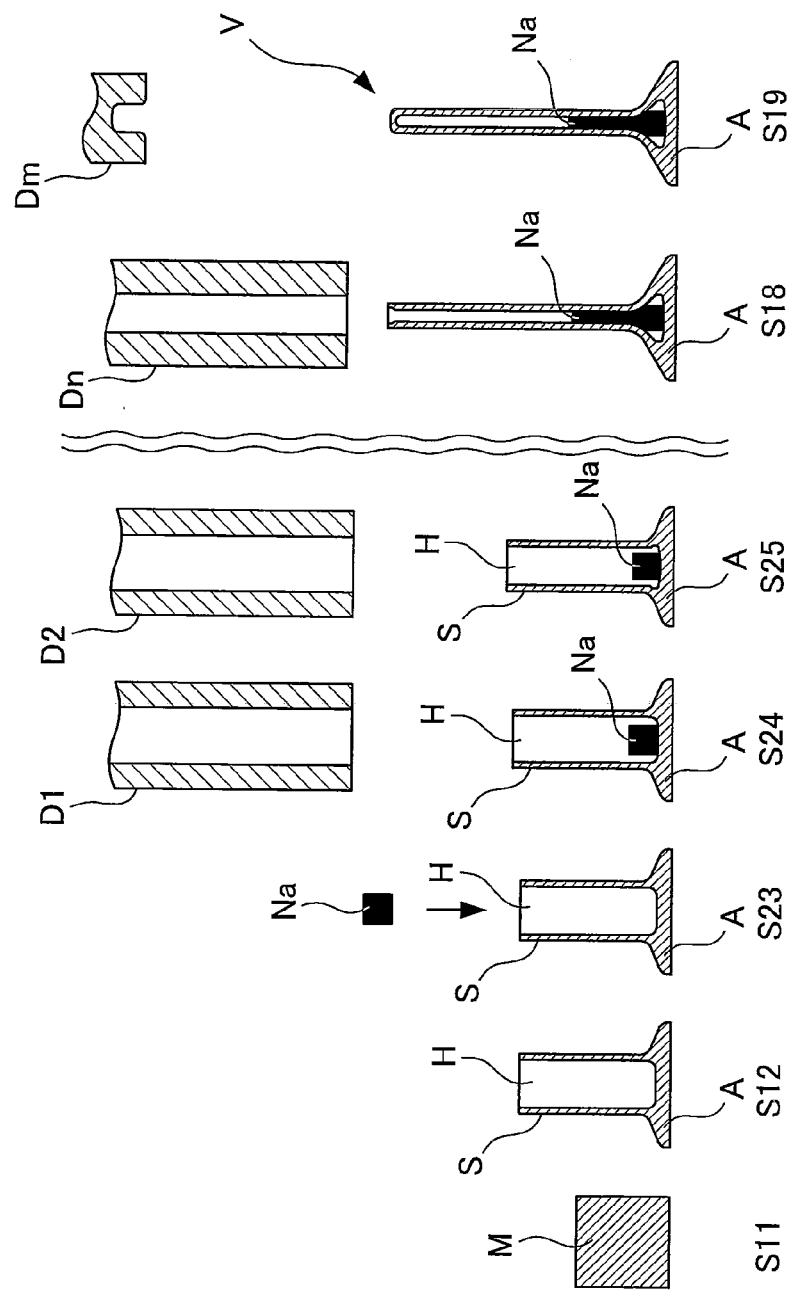
FIG. 2 is a view for explaining procedures in another embodiment of a method for producing a metallic-sodium-filled engine valve of the present invention.

In the aforementioned embodiment, as described above, the stem portion S is drawn to the specified size (for example, an inner diameter of about 10 to 15 mm) which is larger than the intended size, the block-shaped piece of solid metallic sodium Na (for example, a hexahedron with edges each having a length of about 8 to 13 mm) is then put into the hollow portion H of the stem portion S, and the stem portion S is thereafter shaped to the intended size by further drawing the stem portion S. However, another embodiment as described below can be employed. For example, as shown in FIG. 2, a material M is prepared (step S11). Then, an umbrella portion A is formed by forging or the like while a hollow portion H is formed with a punch and the like (step S12). Next, a block-shaped piece of metallic sodium Na (for example, a hexahedron with edges each having a length of about 13 to 17 mm) cut out from raw sodium into a predetermined size is put into the hollow portion H from an opening in an upper portion of the hollow portion H in a dry inert gas atmosphere (for example, a dry nitride gas or the like) (step S23). Thereafter, the stem portion S is drawn by being inserted into a die D1 to reduce the sizes of the outer diameter and the inner diameter of the stem portion S and to increase the length thereof (step S24). Hereafter, as in the aforementioned descriptions, processes of drawing are then sequentially performed in the dry inert gas atmosphere to reduce, stepwise, the outer diameter and the inner diameter of the stem portion S to intended sizes and to increase, stepwise, the length thereof to an intended length by using multiple dies D2, Dn, and the like different in size sequentially, the multiple dies D2, Dn, and the like each having an inner diameter slightly smaller than one used therebefore (step S25, S18). Thereafter, an end portion of the stem portion S is closed by performing forging with a metal die Dm (step S19). An engine valve V having the hollow portion H of the stem portion S filled with metallic sodium Na is thus obtained. In other words, it is also possible to put the block-shaped piece of solid metallic sodium Na into the hollow portion H of the stem portion S before the stem portion S drawn, and then shape the stem portion to the intended size by drawing the stem portion S.

However, when the stem portion S is drawn to a specified size (for example, an inner diameter of about 10 to 15 mm)

which is larger than the intended size, the block-shaped piece of solid metallic sodium Na (for example, a hexahedron with edges each having a length of about 8 to 13 mm) is then put into the hollow portion H of the stem portion S, and the stem portion S is thereafter shaped to the intended size by further drawing the stem portion S as in the embodiment describe above, the number of steps of drawing performed under the dry inert gas atmosphere can be minimized. This is very preferable since the reduction in work efficiency can be suppressed.

Industrial Applicability

Metallic sodium can be easily put into the inside of the engine valve by using the method for producing a metallic-sodium-filled engine valve of the present invention. Thus, the method can be used very effectively in the industrial field.

Reference Signs List

V engine valve
A umbrella portion
S stem portion
H hollow portion
D1, D2, Dx, Dx+1, Dn die
Dm metal die
Na metallic sodium

The invention claimed is:

1. A method for producing an engine valve filled inside with metallic sodium, the engine valve produced by: shaping a stem portion having a hollow portion to an intended size by sequentially drawing the stem portion in such a way that sizes of an outer diameter and an inner diameter of the stem portion are reduced stepwise; and putting metallic sodium into the hollow portion of the stem portion, the method comprising shaping the stem portion to the intended size by drawing the stem portion after putting a block-shaped piece of solid metallic sodium into the hollow portion of the stem portion.

2. The method for producing a metallic-sodium-filled engine valve according to claim 1, wherein the stem portion is shaped to the intended size by drawing the stem portion until the inner diameter of the hollow portion of the stem portion is reduced to a specified size, then putting the block-shaped piece of solid metallic sodium into the hollow portion of the stem portion, and thereafter further drawing the stem portion.

3. The method for producing a metallic-sodium-filled engine valve according to claim 1, wherein the stem portion is shaped to the intended size by drawing the stem portion after putting the block-shaped piece of solid metallic sodium into the hollow portion of the stem portion before performing the drawing of the stem portion.

* * * * *